US010388922B2

(12) United States Patent
Sasaki et al.

(10) Patent No.: US 10,388,922 B2
(45) Date of Patent: Aug. 20, 2019

(54) ELECTRONIC APPARATUS

(71) Applicant: Panasonic Intellectual Property Management Co., Ltd., Osaka (JP)

(72) Inventors: Takeyuki Sasaki, Kanagawa (JP); Tatsuya Higashii, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 72 days.

(21) Appl. No.: 15/854,161

(22) Filed: Dec. 26, 2017

(65) Prior Publication Data

US 2018/0301673 A1 Oct. 18, 2018

(30) Foreign Application Priority Data

Apr. 18, 2017 (JP) ................................ 2017-082104

(51) Int. Cl.
| | |
|---|---|
| *H01M 2/10* | (2006.01) |
| *H04B 1/3883* | (2015.01) |
| *H01M 2/02* | (2006.01) |
| *H04M 1/02* | (2006.01) |

(52) U.S. Cl.
CPC ....... *H01M 2/1066* (2013.01); *H01M 2/0207* (2013.01); *H04B 1/3883* (2013.01); *H04M 1/0262* (2013.01); *H04M 2001/0204* (2013.01)

(58) Field of Classification Search
CPC .......................... H01M 2/1066; H01M 2/0207
See application file for complete search history.

(56) References Cited

U.S. PATENT DOCUMENTS 5,834,753 A * 11/1998 Danielson ........... B60R 16/0231
                                                              235/472.01
2011/0142249 A1    6/2011  Shinozaki

FOREIGN PATENT DOCUMENTS

JP          2011-124886        6/2011

* cited by examiner

*Primary Examiner* — Helen Oi K Conley
(74) *Attorney, Agent, or Firm* — Greenblum & Bernstein, P.C.

(57) ABSTRACT

An electronic apparatus includes a terminal body, a battery cover detachable from the terminal body, and a connection member connecting the terminal body to the battery cover. The terminal body includes a first body portion and a second body portion, and a thickness of the first body portion is formed to be greater than a thickness of the second body portion. The battery cover is provided with a locking portion and a lock mechanism portion that can be attached to the terminal body. The connection member includes a first connection portion and a second connection portion and includes thick first and second regions, a thin third region, and a bent portion. When the battery cover is attached to the terminal body, the bent portion is bent and the connection member is stored in a space.

7 Claims, 5 Drawing Sheets

ELECTRONIC APPARATUS

BACKGROUND

1. Technical Field

The present disclosure relates to an electronic apparatus including a connection member.

2. Description of the Related Art

It is known that a battery cover includes a connection member preventing the battery cover from being detached from a housing (refer to Japanese Patent Unexamined Publication No. 2011-124886 (PTL 1)).

PTL 1 discloses a battery storage mechanism of a noise cancel headphone which includes a battery storage portion on a side surface of at least one of left and right housings, and includes a battery storage portion provided on a side surface of the housing, a battery cover for opening and closing the battery storage portion, and a flexible connection member preventing the battery cover from being detached from the housing in a state where the battery cover opens the battery storage portion, and in which, even when a large external force is unexpectedly applied to the battery cover, the battery cover does not cause the battery storage portion to be opened and is not broken.

SUMMARY

In Patent Document 1, a connection member is stored in a battery cover and is intentionally prevented from being cut, but when a large battery is stored, the entire surface of the battery needs to be firmly pressed down by the battery cover, and there is a problem that it is difficult to press down the entire surface of the battery, even if the battery cover is closed by the connection member.

An object of the present disclosure is to provide an electronic apparatus capable of reliably storing a connection member while pressing the entire surface of a battery with a battery cover.

An electronic apparatus according to the present disclosure includes a terminal body that stores a battery, a battery cover that is detachable from the terminal body, and a connection member that connects the battery cover to the terminal body. The terminal body includes a first body portion and a second body portion including a battery storage portion which stores the battery, and the first body portion is thicker than the second body portion. The battery cover includes a locking portion that is locked by being inserted into the first body portion in an insertion direction, a step difference portion that is provided in a direction substantially perpendicular to the insertion direction, and a lock mechanism portion that is provided in a region opposite to a region where the locking portion is provided using the step difference portion as a boundary, and detachably locks the battery cover which is attached to the terminal body in the second body portion. The battery cover is in direct contact with the battery in a region opposite to a region where the locking portion is provided, in a state of being attached to the terminal body. The connection member is connected to a first body portion of the terminal body via a first connection portion and is connected to a region where the locking portion of the battery cover is provided via a second connection portion which is located on a side opposite to the first connection portion. The connection member is stored only in a space that is surrounded by at least the first body portion, a battery which is stored in the battery storage portion, and the battery cover including the step difference portion, in a state where the battery cover is attached to the terminal body.

According to the present disclosure, when a battery cover is attached to a terminal body, the entire surface of the battery is reliably pressed by the battery cover, and the battery cover is prevented from being detached or damaged from the terminal body. In addition, even if a connection member is somewhat long, the connection member can be reliably stored in a space in a first body portion having a connection member of which a thickness is larger without entering a groove between the battery and the terminal body. The connection member does not protrude from the battery cover, an attachment work can be easily performed without increasing a work load for replacing the battery by a user, and it is possible to obtain convenience of removing the battery cover and to reliably hold the battery.

DETAILED DESCRIPTION

Hereinafter, an embodiment (hereinafter, referred to as "the present embodiment") in which an electronic apparatus according to the present disclosure is specifically disclosed will be described in detail with reference to the drawings as appropriate. However, detailed description more than necessary may be omitted. For example, detailed description on well-known matters and redundant description on substantially the same configuration may be omitted. This is to avoid unnecessary redundancy of the following description and to facilitate understanding of those skilled in the art. The accompanying drawings and the following description are provided to enable those skilled in the art to fully understand the present disclosure, and are not intended to limit the claimed subject matter thereby.

Hereinafter, preferred embodiments for implementing the present disclosure will be described in detail with reference to the drawings.

Figure 1A:
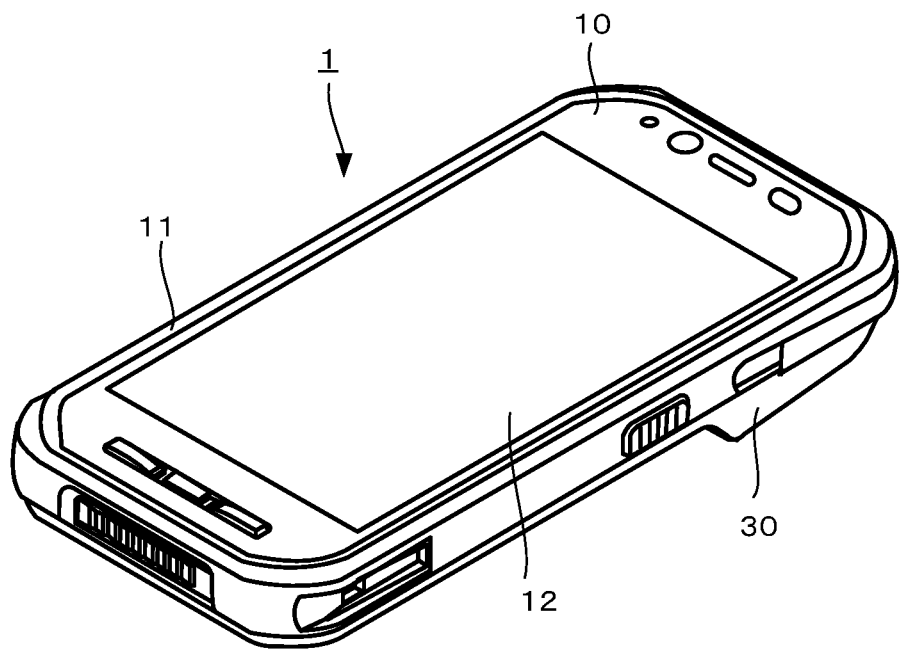
FIG. 1A is a front perspective view illustrating an example of an electronic apparatus according to the present disclosure.
Figure 1B:
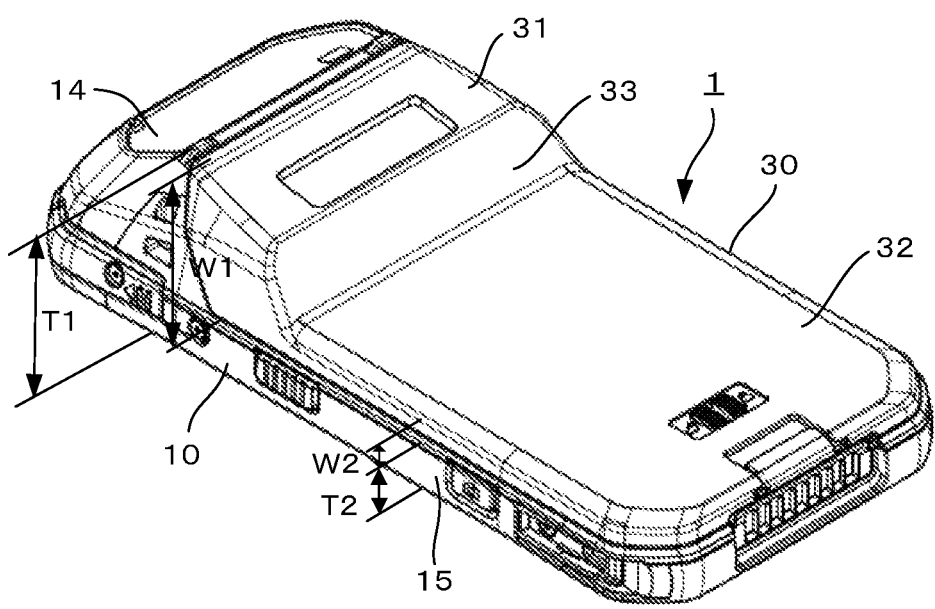
FIG. 1B is a rear perspective view illustrating the example of the electronic apparatus according to the present disclosure.
Figure 2:
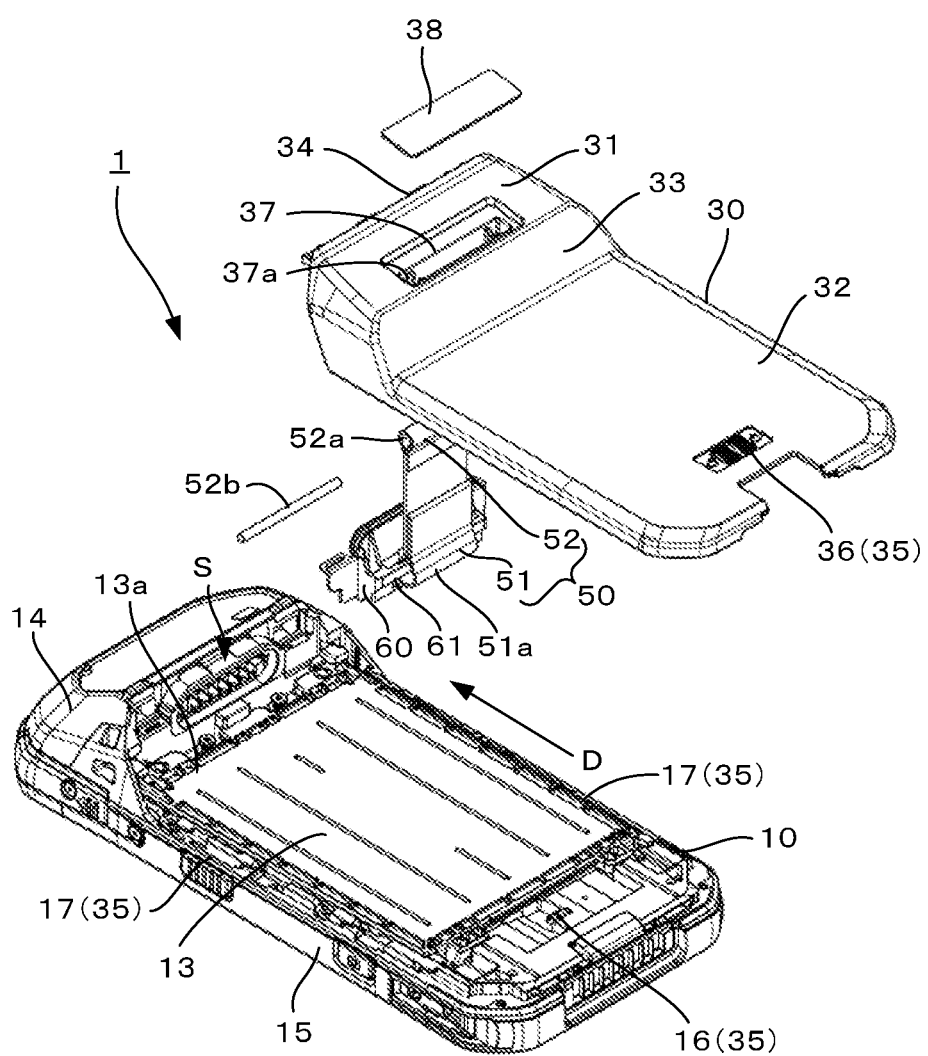
FIG. 2 is an exploded perspective view of FIG. 1B.
Figure 3A:
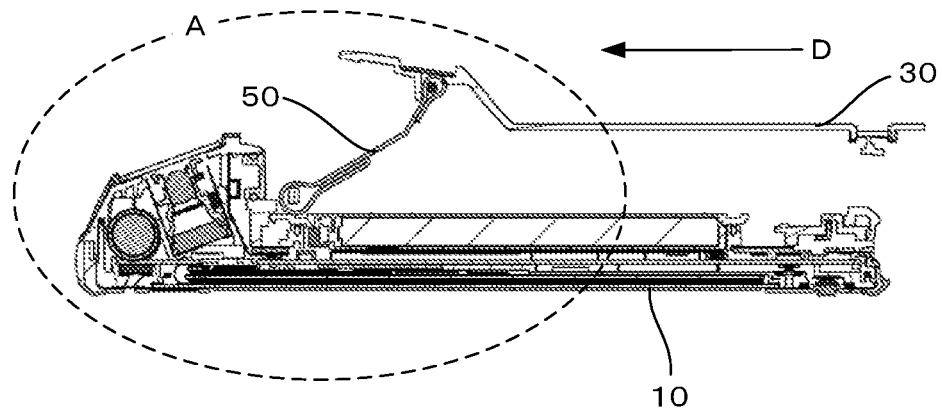
FIG. 3A is a sectional view illustrating an initial stage of attaching a battery cover to a terminal body of the electronic apparatus according to the present disclosure.
Figure 3B:
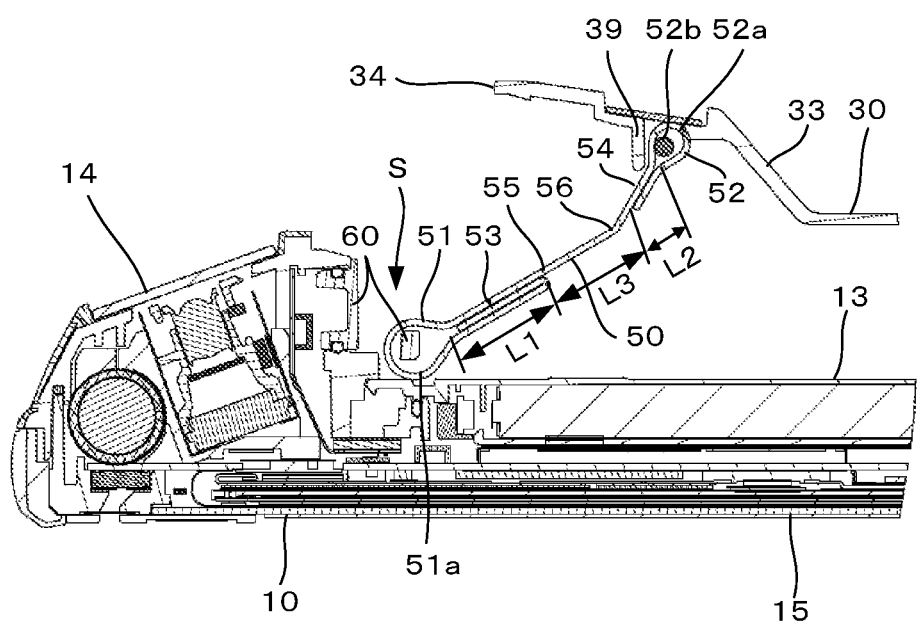
FIG. 3B is an enlarged view of portion A in FIG. 3A.

FIG. 1A is a front perspective view illustrating an example of an electronic apparatus according to the present disclosure, and FIG. 1B is a rear perspective view illustrating the example of the electronic apparatus according to the present disclosure. FIG. 2 is an exploded perspective view of FIG. 1B. FIGS. 3A and 3B are sectional views illustrating an initial stage of assembly. The electronic apparatus according to the present disclosure will be described in detail with reference to FIGS. 1A to 3B.

Electronic apparatus 1 includes personal and business applications, and is, for example, a mobile phone such as a smartphone, a mobile terminal such as a tablet, a digital camera, a portable personal computer, a wireless device, or the like, and includes terminal body 10 and battery cover 30 detachable to terminal body 10, and connection member 50 connecting terminal body 10 to battery cover 30.

Terminal body 10 includes substantially rectangular housing 11 mainly formed of resin, display 12 configured by a display such as a liquid crystal panel or an organic EL panel is stored on a front side of housing 11, and battery 13 is stored on a rear side of housing 11. In addition, terminal body 10 includes first body portion 14 and second body portion 15 including a battery storage portion for storing battery 13, and thickness T1 of first body portion 14 is formed to be larger than thickness T2 of second body portion 15.

Battery cover 30 has a substantially rectangular shape formed of a resin-molded article or the like, is detachably attached to housing 11 of terminal body 10, and directly covers battery 13 in the attached state. Battery cover 30 includes first cover portion 31 bonded to first body portion 14 and second cover portion 32 bonded to second body portion 15. In addition, thickness W1 of the first cover portion 31 is formed to be larger than thickness W2 of second cover portion 32, and the inclined step difference portion 33 which eliminates a difference in thickness between first cover portion 31 and second cover portion 32 and connects the first cover portion to the second cover portion is provided. Step difference portion 33 is provided in a direction substantially perpendicular to insertion direction D for attaching battery cover 30 to terminal body 10.

In addition, battery cover 30 includes locking portion 34 that can be attached to the terminal body 10, and lock mechanism portion 35. Locking portion 34 is provided at a front end of first cover portion 31 and is locked by being inserted into first body portion 14 in insertion direction D. First cover portion 31 of battery cover 30 is provided with insertion portion 37 having an opening to which one end of connection member 50 is engaged.

Lock mechanism portion 35 is provided in a region opposite to a region where locking portion 34 is provided with step difference portion 33 as a boundary, and detachably locks battery cover 30 attached to terminal body 10 to second body portion 15. In addition, lock mechanism portion 35 includes first lock portion 16 which is disposed from an end portion of second body portion 15 provided in second body portion 15 of terminal body 10 to a substantially central portion, second lock portion 17 disposed at a side end of second body portion 15, and a lock button 36 having a lock hook locking first lock portion 16.

Connection member 50 is configured by a strap, a band or the like, and is stored in space S surrounded by battery cover 30 including first body portion 14, battery 13, and step difference portion 33 in a state where battery cover 30 is attached to terminal body 10. In addition, connection member 50 includes first connection portion 51 and second connection portion 52 located on a side opposite to first connection portion 51. For example, first connection portion 51 slides freely to be attached to first body portion 14 of terminal body 10 via connector 60, and second connection portion 52 slide freely to be attached to insertion portion 37 provided in first cover portion 31 of battery cover 30. The term "slide freely" indicates a state in which a member is movable with a predetermined play.

In addition, in order to easily replace with and to easily maintain another member (gadget) different from battery cover 30, first connection portion 51 and second connection portion 52 are in a detachable state with respect to terminal body 10 and battery cover 30, respectively.

First connection portion 51 is attached to support portion 61 of connector 60, but since an outer diameter of support portion 61 is formed to be considerably smaller than an inner diameter of annular portion 51a formed in first connection portion 51, movement of first connection portion 51 can be deformed with considerable play.

Attachment of second connection portion 52 and battery cover 30 is performed according to the following sequence in the present disclosure. First, tubular portion 52a having a substantially circular cross section formed at a front end of second connection portion 52 is inserted from a lower portion of insertion portion 37 and protrudes from an upper portion of insertion portion 37. Next, substantially cylindrical pin 52b having a diameter smaller than an inner diameter of tubular portion 52a and longer than a length of tubular portion 52a is inserted into tubular portion 52a, and both ends of pin 52b protrude from both ends of tubular portion 52a. Connection member 50 is pulled downward, the protruded portion of pin 52b is placed on placer 37a provided in insertion portion 37, and cover 38 covering insertion portion 37 is attached from an upper portion of insertion portion 37.

In addition, connection member 50 includes a plurality of regions, each having a predetermined length between first connection portion 51 and second connection portion 52. First region 53 occupying first distance L1 from first connection portion 51 is provided near first connection portion 51, and second region 54 occupying second distance L2 from second connection portion 52 is provided near second connection portion 52.

Third region 55 connecting both and occupying third distance L3 is provided between first region 53 and second region 54. Bent portion 56 is formed at a boundary between second region 54 and third region 55. Meanwhile, a plurality of bent portions 56 may be provided between first connection portion 51 and second connection portion 52.

In order to ensure rigidity and make bending difficult, first region 53 is formed by folding back the band portion configuring connection member 50 twice in the present disclosure, and a thickness of first region 53 is greater than thicknesses of second region 54 and third region 55. In addition, in the same manner, second region 54 is also formed by folding back the band portion once in the present disclosure, and thereby, the thickness is greater than the thickness of third region 55.

Figure 4A:
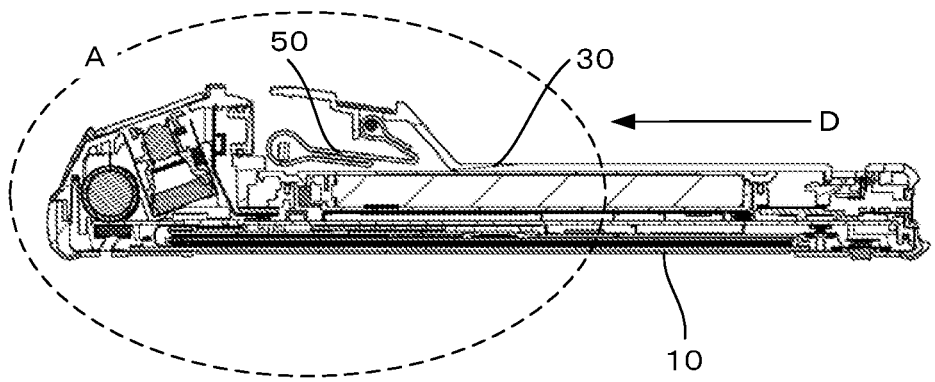
FIG. 4A is a sectional view illustrating the time of a contact between the battery cover and a battery subsequent to FIG. 3A.
Figure 4B:
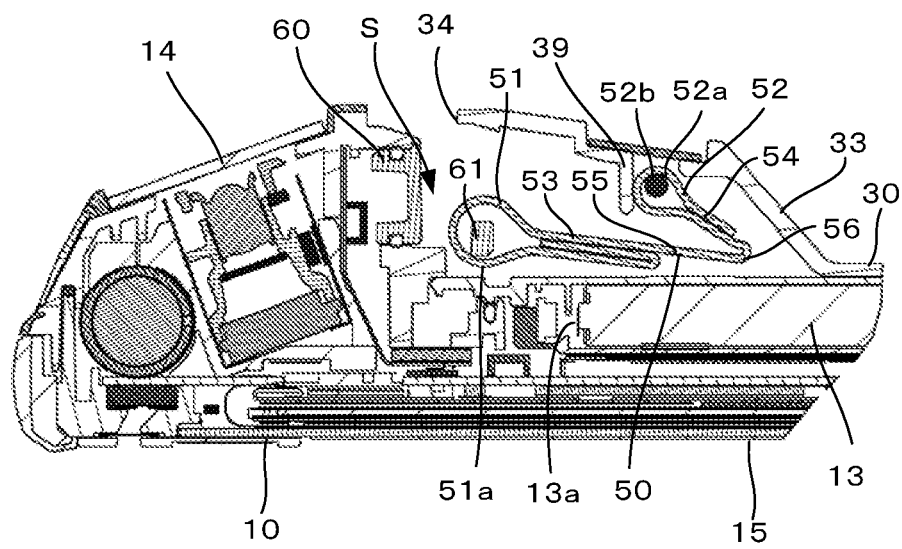
FIG. 4B is an enlarged view of portion A in FIG. 4A.
Figure 5A:
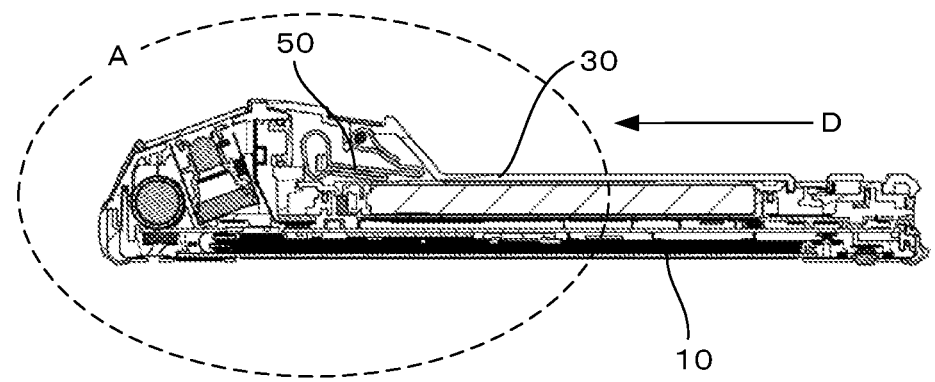
FIG. 5A is a sectional view at the time of attaching subsequent to FIG. 4A.
Figure 5B:
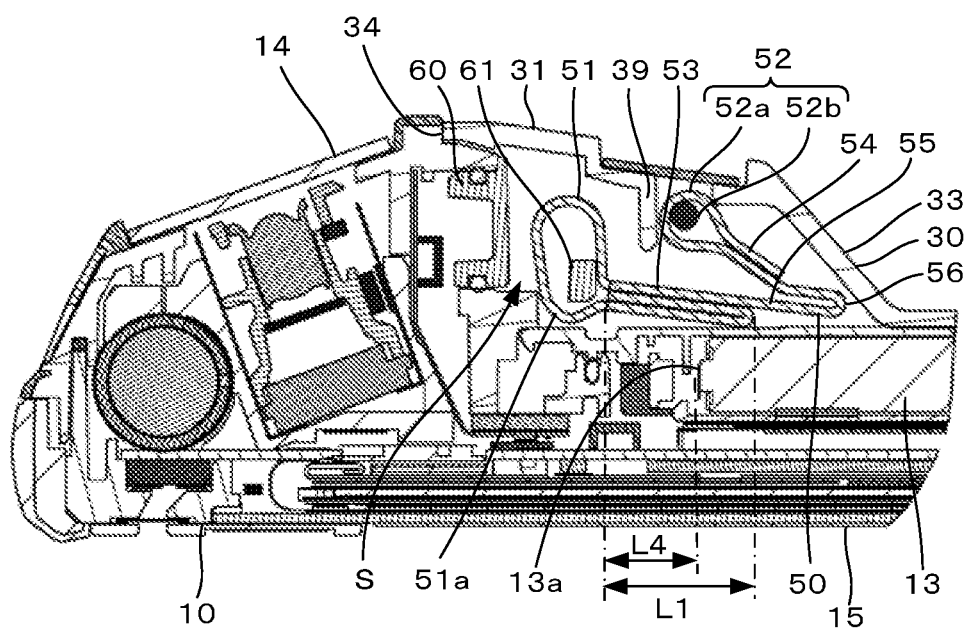
FIG. 5B is an enlarged view of portion A in FIG. 5A.

FIGS. 3A and 3B illustrate an initial stage of attaching battery cover 30 to terminal body 10, FIGS. 4A and 4B illustrate the time of a contact between battery cover 30 and battery 13, and FIGS. 5A and 5B illustrate time of attaching. A specific movement of connection member 50 at the time of attaching battery cover 30 to terminal body 10 will be described with reference to FIGS. 3A to 5B.

Battery cover 30 connected to terminal body 10 via connection member 50 is moved from an upper portion of terminal body 10 in insertion direction D. In an initial state, connection member 50 has a substantially flat shape. In addition, first connection portion 51 of connection member 50 is located closer to first body portion 14 than side surface 13a of battery 13, and is stored in space S surrounded by first body portion 14, battery 13, battery cover 30 including step difference portion 33.

Second connection portion 52 is disposed near protrusion portion 39 protruding from a rear surface of battery cover 30 into space S, and movement of second region 54 of connection member 50 toward locking portion 34 in insertion direction D is restricted by protrusion portion 39.

Next, second cover portion 32 of battery cover 30 comes into contact with second body portion 15 of terminal body 10 (see FIGS. 4A and 4B). In this state, the vicinity of a boundary between second region 54 and third region 55 of connection member 50 is bent as bent portion 56. Since first region 53 and second region 54 are thickly formed to maintain rigidity as compared with third region 55, connection member 50 is bent in third region 55 having a small thickness.

Second connection portion 52 approaches first body portion 14 following the movement of battery cover 30 in insertion direction D, and bent portion 56 moves in a center direction of battery 13 which is a direction far away from side surface 13a of battery 13 while being bent. While a surface of second connection portion 52 is restricted by protrusion portion 39, tubular portion 52a rotates around pin 52b, and first connection portion 51 moves upward in space S in a direction far away from bent portion 56.

After locking portion 34 is locked into first body portion 14 and battery cover 30 is slidingly attached, periphery of battery 13 and battery 13 on the rear side are firmly pressed by battery cover 30, and thereby, the battery is locked into lock mechanism portion 35 (see FIGS. 5A and 5B). At this time, first connection portion 51 moves in a direction far away from bent portion 56, and bent portion 56 is located at a position far away from first connection portion 51 and second connection portion 52 in the space S as viewed from locking portion 34 side.

In a state where battery cover 30 is attached to terminal body 10, connection member 50 is bent at bent portion 56 located between first connection portion 51 and second connection portion 52, and in this state, connection member 50 is stored in space S. In addition, since having a greater thickness than thicknesses of other regions 54 and 55, first region 53 slides on an upper surface of battery 13 without being interposed between components or the like, and as the result, first distance L1 of first region 53 becomes longer than distance L4 from first connection portion 51 to side surface 13a of battery 13 near first connection portion 51. Annular portion 51a is deformed and moves upward in space S.

In an operation of attaching battery cover 30 to terminal body 10, connection member 50 deformingly moves in space S defined by first body portion 14, first cover portion 31, step difference portion 33, and a surface of battery 13, while utilizing rigidity of three regions 53, 54, and 55 having different thicknesses with each other. Accordingly, connection member 50 can be stored in space S although the connection member is long. In addition, since connection member 50 is stored only in space S, the entire rear surface of second cover portion 32 of battery cover 30 can directly come into contact with battery 13 without obstructing connection member 50, and thereby, battery 13 can be reliably held.

As described above, electronic apparatus 1 according to the present embodiment includes terminal body 10 that stores battery 13, battery cover 30 detachable from terminal body 10, and connection member 50 connecting battery cover 30 to terminal body 10. Terminal body 10 includes first body portion 14 and second body portion 15 including a battery storage portion storing battery 13. First body portion 14 is thicker than second body portion 15. Battery cover 30 includes locking portion 34 locked into first body portion 14 by inserting in insertion direction D, step difference portion 33 provided in a direction substantially perpendicular to insertion direction D, and lock mechanism portion 35 which is provided in a region opposite to a region where locking portion 34 is provided using step difference portion 33 as a boundary and detachably locks battery cover 30 attached to terminal body 10 in second body portion 15. Connection member 50 is connected to terminal body 10 via first connection portion 51 and is connected to batter cover 30 via second connection portion 52 located on a side opposite to first connection portion 51. Connection member 50 is stored in space S surrounded by at least first body portion 14, battery 13 stored in a battery storage portion, and battery cover 30 including step difference portion 33 in a state where battery cover 30 is attached to terminal body 10.

Thereby, when battery cover 30 is attached to terminal body 10, the entire surface of battery 13 is reliably pressed by battery cover 30, and thus, battery cover 30 is prevented from being dropped or lost from a terminal body. Locking portion 34 can maintain locking battery cover 30 and terminal body 10, and lock mechanism portion 35 can firmly press battery 13 from above. In addition, even if connection member 50 is somewhat long, connection member 50 can be reliably stored in space S in first body portion 14 having a thickness greater than a thickness of connection member 50 without entering a groove between battery 13 and terminal body 10. Connection member 50 does not protrude from battery cover 30, an attachment work can be easily performed without increasing a work load for replacing battery 13 by a user, and it is possible to obtain convenience of removing battery cover 30 and to reliably hold battery 13.

As described above, in electronic apparatus 1 according to the present embodiment, connection member 50 is stored in space S in a state where connection member 50 is bent by at least one bent portion 56 located between first connection portion 51 and second connection portion 52. Thereby, connection member 50 can be stored in compact space S by having bent portion 56.

As described above, in electronic apparatus 1 according to the present embodiment, a thickness of first region 53 occupying first distance L1 from first connection portion 51 of connection member 50 is greater than a thickness of the other regions 54 and 55, and first distance L1 is longer than a distance from the first connection portion 51 to side surface 13a of battery 13 near first connection portion 51. Thereby, rigidity of a portion having a thickness is secured, and the portion becomes difficult to bend. In addition, since having rigidity, first region 53 can be prevented from being interposed between battery 13 and terminal body 10 by sliding to a side surface of battery 13.

As described above, in the electronic apparatus 1 according to the present embodiment, second region 54 occupying second distance L2 from second connection portion 52 of connection member 50 forms a part of the other region, and second region 54 is thicker than third region 55 other than second region 54 of the other region. Thereby, rigidity is secured in a portion having a thickness, and the portion becomes difficult to bend. Thick second region 54 is provided at another end in addition to first region 53 to prompt formation of bent portion 56, and thus, connection member 50 can be easily stored in space S.

As described above, in the electronic apparatus 1 according to the present embodiment, first connection portion 51 is connected to first body portion 14 in a movable state with a predetermined play. Second connection portion 52 is located at a position far away from first connection portion 51 when viewed from locking portion 34 side. In a process of moving battery cover 30 in insertion direction D to be attached to terminal body 10, connection member 50 is bent in at least one bent portion 56 located between first region 53 and second region 54, and first connection portion 51 moves in a direction far away from bent portion 56. In a state where battery cover 30 is attached to terminal body 10, bent portion 56 is within space S and is located at a position far away from first connection portion 51 and second connection portion 52 as viewed from locking portion 34 side.

Thereby, first connection portion 51 and bent portion 56 are separated from each other, and long connection member 50 is also easily stored in space S.

As described above, in electronic apparatus 1 according to the present embodiment, battery cover 30 includes protrusion portion 39 protruding in space S at a position between first connection portion 51 and second connection portion 52 in insertion direction D, and protrusion portion 39 restricts movement of second region 54 toward locking portion 34 in insertion direction D. Thereby, protrusion portion 39 restricts rigid second region 54 to a rear side, bent portion 56 is easily formed on the rear side far away from first connection portion 51, and long connection member 50 can also be easily stored in space S.

As described above, in electronic apparatus 1 according to the present embodiment, first connection portion 51 and second connection portion 52 are detachable from terminal body 10 and battery cover 30, respectively. Thereby, it is easy to replace battery cover 30 with other members (gadget) different from battery cover 30 and to maintain battery cover 30.

As described above, while an embodiment of the electronic apparatus according to the present disclosure is described with reference to the drawings, the present disclosure is not limited to such an example. Those skilled in the art will appreciate that various change examples, modification examples, substitution examples, addition examples, removal examples, and equivalent examples can be conceived within the scope of claims, and it is understood that those are naturally within the technical scope of the present disclosure.

What is claimed is:

1. An electronic apparatus comprising:
   a terminal body that stores a battery;
   a battery cover that is detachable from the terminal body; and
   a connection member that connects the battery cover to the terminal body,
   wherein the terminal body includes a first body portion and a second body portion including a battery storage portion which stores the battery, and the first body portion is thicker than the second body portion,
   wherein the battery cover includes a locking portion that is locked by being inserted into the first body portion in an insertion direction, a step difference portion that is provided in a direction substantially perpendicular to the insertion direction, and a lock mechanism portion that is provided in a region opposite to a region where the locking portion is provided using the step difference portion as a boundary, and detachably locks the battery cover which is attached to the terminal body in the second body portion,
   wherein the battery cover is in direct contact with the battery that is stored in the battery storage portion in a region opposite to a region where the locking portion is provided, in a state of being attached to the terminal body,
   wherein the connection member is connected to a first body portion of the terminal body via a first connection portion and is connected to a region where the locking portion of the battery cover is provided via a second connection portion which is located on a side opposite to the first connection portion, and
   wherein the connection member is stored only in a space that is surrounded by at least the first body portion, a battery which is stored in the battery storage portion, and the battery cover including the step difference portion, in a state where the battery cover is attached to the terminal body.

2. The electronic apparatus of claim 1, wherein the connection member is stored in the space in a state of being bent in at least one bent portion that is located between the first connection portion and the second connection portion.

3. The electronic apparatus of claim 1,
   wherein a first region that occupies a first distance from the first connection portion of the connection member is thicker than other regions, and
   wherein the first distance is longer than a distance from the first connection portion to a side surface of the battery near the first connection portion.

4. The electronic apparatus of claim 3,
   wherein a second region that occupies a second distance from the second connection portion of the connection member forms a part of the other region, and
   wherein the second region is thicker than a third region other than the second region of the other region.

5. The electronic apparatus of claim 4,
   wherein the first connection portion is connected to the first body portion in a movable state with a predetermined play,
   wherein the second connection portion is located at a position far away from the first connection portion when viewed from the locking portion side,
   wherein the connection member is bent in at least one bent portion that is located between the first region and the second region in the process of moving the battery cover in the insertion direction to be attached to the terminal body, and the first connection portion moves in a direction far away from the bent portion, and
   wherein the bent portion is located at a position far away from the first connection portion and the second connection portion in the space when viewed from the locking portion side, in a state of being attached to the terminal body.

6. The electronic apparatus of claim 5,
   wherein the battery cover includes a protrusion portion that protrudes into the space at a position between the first connection portion and the second connection portion in the insertion direction, and
   wherein the protrusion portion restricts movement of the second region toward the locking portion side in the insertion direction.

7. The electronic apparatus of claim 4, wherein the first connection portion and the second connection portion are detachable from the terminal body and the battery cover, respectively.

* * * * *